Patented Sept. 30, 1941

2,257,467

UNITED STATES PATENT OFFICE 2,257,467

CLEANING COMPOSITION

Samuel Jacobson, Cincinnati, Ohio, assignor to Max H. Thurnauer, Cincinnati, Ohio No Drawing. Application March 2, 1938, Serial No. 193,532

1 Claim. (Cl. 252—145)

This invention relates to a solidified acid composition specifically suited for the purpose of cleansing toilet and urinal bowls, concrete and tile floors, and surfaces similarly difficult to clean with the conventional powders and liquids. The alkaline cleansers, soap powders, washing soda, and the like are not effective for the purpose since they do not react with soil of the type most frequently encountered.

The objective of the invention, briefly, has been to provide a cleanser consisting of an active acid paste or jelly. The invention is predicated upon the concept that it would be much easier, more efficient, and certainly much more agreeable to cleanse the surfaces of the toilet bowls and basins and the like by using neither a liquid, which quickly would drain off, nor a powder, which would have to be worked or rubbed off, but rather a somewhat viscous cleansing jelly suited to be spread evenly over the soiled areas, react with the soil, and then be flushed off with clear water. The invention provides a cleansing composition possessing these capacities and also a method for making such a cleanser.

Broadly speaking, the invention is predicated upon the concept of providing a jelly or paste comprised essentially of silica reacted with an acid which is reactive to the soil to be removed, and which possesses the capacity to form a gel with the silica. The proportions of the components are such that the gel "lattice," or the jelly structure is a suitably stable one, so that the gel may be stored and shipped without decomposing, but with the acid, however, available for reaction with the soil. In this product, also, the relative quantity and strength of the acid is such as to enable prompt removal of the soil upon a surface over which the jelly may be spread.

So far as I am aware, there have been available materials which are known as "silica gels." These gels are used mainly for absorption purposes. They are of hard, granular consistency and possess many of the properties of ordinary powdered silica, with the exception that the silica has been activated and made porous and absorptive, both to liquids and gases. Such hard, granular gels are wholly unlike the product of the present invention, despite the fact that their name suggests a possible similarity.

In the present invention, the compositions are soft and pasty, and possess many of the physical properties of gelatinous dessert. However, these gels are possessed of an active acid content which is sufficient in amount to enable prompt removal of the soil which is encountered in the lavatories.

I have discovered that such compositions are much better adapted to use for the cleansing purposes which have been described, and are much more efficient in their action than the cleansers which have been available to the janitors in the past. They are particularly useful since they may be applied easily to localized areas for localized action upon the incrustations of soil, without danger to the janitor using them.

The following formula illustrates a preferred composition of the invention:

| | Parts by volume |
|---|---|
| Sodium silicate aqueous solution of 10% strength by weight | 30 |
| Water | 20 |
| Hydrochloric acid (sp. gravity 1.19) | 50 |

This composition contains approximately 2.14 grams of $SiO_2$ per 100 cc. of gel, or, otherwise expressed, it contains approximately 3.0% by weight of silica expressed as sodium silicate $3.2SiO_2 \cdot 1Na_2O$.

In practicing the invention I prefer to use, for reaction with the acid, a commercial sodium silicate or "waterglass" of the approximate composition, $3.2SiO_2 \cdot 1Na_2O$. The material is referred to in the silicate trade as commercial sodium silicate grade 40, and has the following proximate analysis:

| | Per cent by weight |
|---|---|
| $Na_2O$ | 8.9 |
| $SiO_2$ | 28.5 |
| Water | 62.6 |

While this material is a viscous liquid, it can be diluted readily with water. In place of this material, silicates containing a greater percentage of solids may be used though special attention may be required to effect their dissolution or admixture with water. Commercial silicates containing a lesser proportion of $SiO_2$, such as the metasilicate and even the silicates of higher alkali content, can be used, if desirous, to supply the silica, though with these there is the disadvantage that additional quantities of acids are required to neutralize the alkali of the silicate. Also, in place of sodium silicate, potassium and similar alkali metal silicates can be used, though these usually are not as desirable because of their higher price.

To be useful, a composition of the type which I have sought first must make available a supply of acid for reaction with the soil on the surface over which the jelly has been spread, and yet it must be sufficiently stable to withstand the adverse conditions of shipping and handling. These two properties essentially are antagonistic toward one another. A soft jelly, for instance, may release its acids for consumption but be so unstable that it would turn into mush after shipping, while a harder gel might withstand the adverse influences of shipping yet not part with the acid, or be too stiff to be spread easily.

However, I have discovered that the consistency of the gel is determined primarily by the quantity of silica which is present in the composition. Through this determination, the production of a product in which the two properties, stability of structure on the one hand, and availability of acid on the other, is achieved. In the practice of the invention, the quantity of the silica (expressed as solid sodium silicate

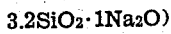

should be within the approximate range of 2% to 10% of the total weight of the composition.

If the composition contains less than approximately 2% of silica (as expressed above) the gel structure sets up very slowly and, even once set up, is a somewhat mushy mass of which the structure easily is broken. Compositions containing substantially less than 2% of alkali metal silicate, in other words, require too much time to set to the proper structure and tend to bleed or leak liquid if they are disturbed. If the composition contains substantially more than 10%, it sets up into a gel structure in a relatively short period of time, but the gel structure is quite stiff and difficult to handle, also somewhat crumbly, and may fail to release acid in quantities adequate to react promptly with the soil. Also, such a gel is difficult to disperse in water. Neither the lower percentage of 2%, nor the upper percentage of 10% is precisely critical, but within this approximate range I have obtained results which otherwise are difficult to obtain. Thus, the present invention is predicated upon the discovery that the properties which suit the composition specifically to use for cleansing purposes can, somewhat paradoxically, be obtained, not by controlling the acid strength, but rather by controlling the strength of the "vehicle" used to contain and convey it.

Next, I have discovered that relatively large amounts of acid can stably be incorporated in the compositions, if appropriate control of the quantity of silicate is exercised. For example, a gel containing as much as 33% by weight of anhydrous hydrochloric acid gas can be prepared with about 2% by weight of sodium silicate of the described composition.

In place of the hydrochloric acid, mineral acids such as sulphuric and nitric acid also may be used, with proportionate adjustments in the quantities according to the relative strengths of the acids. While nitric acid forms nitrate salts which are more soluble, in general, than the chlorides, the nitric acid is somewhat more corrosive and for this reason its use is not recommended in preference to the hydrochloric acid, though its use may be particularly advantageous in certain instances. Likewise, sulphuric acid also has been found to be effective for removing the usual types of soil which are encountered, but some sulphate salts are relatively water insoluble. The acid selected for the purpose must be one possessing the capacity to form a gel with silica and, of course, the acid also need be effective for removing soil. In the commercial practice of the invention the use of technical hydrochloric acid (specific gravity 1.19) is preferred, since this material is commercially available at low cost.

The following example illustrates a composition made with approximately 2% by weight sodium silicate:

Parts by volume
Sodium silicate (20% strength by weight) ---- 10
Water ---------------------------------- 40
Hydrochloric acid (sp. gravity 1.19) --------- 50

This composition contains about 20% available hydrochloric acid by weight.

An example of a composition made with nitric acid is as follows:

Parts by volume
Sodium silicate (20% strength by weight) ---- 15
Water ---------------------------------- 31
Nitric acid (sp. gravity 1.4) ---------------- 54

This composition contains about 42% by weight of available nitric acid.

An example of a composition made with sulphuric acid is as follows:

Parts by volume
Sodium silicate (approx. 20% strength) ------ 15
Water ---------------------------------- 71
Sulphuric acid (sp. gravity 1.84) ------------ 14

In this case the quantity of available sulphuric acid is approximately 21% by weight.

The silicates referred to in the foregoing examples is the commercial waterglass. Should other silicates be desired to be used those skilled in the art readily will be able to make the mathematical computations to ascertain the quantities to be used.

In the development of the present invention, the experience has indicated that the method of making the composition influences the properties of the resultant material. The method which is preferred is as follows:

First the water is mixed with the concentrated, commercial silicate, which, in itself, is an aqueous solution, until a thorough admixture of the desired strength, as indicated in the foregoing description, is obtained. Next the concentrated acid is added. If the composition is approximately the same as that disclosed in Example 1, gelation occurs in about ½ hour, at a temperature of about 20–22° C. The gel which results from reaction of the components through this procedure can readily be broken with an applicator and smeared easily over the soiled surfaces, but withstands the disturbances of handling without decomposition, and it also can be removed easily from the surfaces after the cleansing is completed, by the application of water. In general, the time of setting varies in accordance with the percentage of silicate present. This characteristic enables the manufacturer to obtain a composition suiting the commercial requirements and the manufacturing requirements as well.

In the commercial practice of the invention, I prefer to mix the components according to the method described, then pour the liquid, before gelation occurs, into the shipping containers, and permit the gel structure to be completed in the containers. In this manner, a product which is convenient to market is obtained.

It has been my experience that if the concentrated commercial silicate, the water, and the acid be added altogether, without regard to the above precaution concerning the sequence of addition, the resultant mixture may be lumpy with liquid inclusions intermediate the lumps. Such compositions usually are not stable, and the liquid tends to bleed from the material so that a layer of liquid eventually separates above a mass of solid. If particular precautions be taken to insure very rapid and thorough mixing of components added collectively to a receptacle, then formation of lumps may be avoided in some instances, but this procedure usually is neither very practical nor very economical.

One of the particular virtues of the present invention is that it provides an efficient cleanser which is essentially not dangerous to use or to ship. Liquid hydrochloric acid cannot be shipped in ordinary containers, but special precautions need be taken, special freight rates have to be paid and special containers have to be used, since damage would be caused if a container was broken and the liquid acid escaped. The composition of this invention is essentially an immobile, but spreadable solid containing an amount of acid effective for the purpose intended, but special precautions need not be taken in its handling or shipping.

Having described my invention, I claim:

A cleansing composition in the form of a gelatinous paste of uniform consistency, the constituting components of which are aqueous solution of sodium silicate of about 10% strength by weight, about 30 parts by volume, water, about 20 parts by volume, and hydrochloric acid having a specific gravity of about 1.19, about 50 parts by volume, the said paste being capable of liberating said acid, thereby enabling the composition to exert a cleansing action upon soil over which said paste is deposited.

SAMUEL JACOBSON.